US010326709B1

(12) United States Patent
Wright et al.

(10) Patent No.: US 10,326,709 B1
(45) Date of Patent: Jun. 18, 2019

(54) CLUSTER AWARE CONTAINER MANAGER

(71) Applicant: EMC Corporation, Hopkinton, MA (US)

(72) Inventors: Eron D. Wright, San Ramon, CA (US); Vijayaraghavan Srinivasaraghavan, Santa Clara, CA (US); Cui Lin, Sunnyvale, CA (US); Andrea L. Heyda, Acton, MA (US); Mark A. O'Connell, Westborough, MA (US); Erik Riedel, Scituate, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 396 days.

(21) Appl. No.: 14/319,348

(22) Filed: Jun. 30, 2014

(51) Int. Cl.
*H04L 12/911* (2013.01)
*G06F 15/167* (2006.01)

(52) U.S. Cl.
CPC .................................. *H04L 47/78* (2013.01)

(58) Field of Classification Search
CPC ......... G06F 3/0665; G06F 2009/45562; G06F 17/30
See application file for complete search history.

(56) References Cited

U.S. PATENT DOCUMENTS

| | | | | |
|---|---|---|---|---|
| 8,589,557 B1* | 11/2013 | Labat | ..................... | G06F 9/5061 709/226 |
| 8,719,320 B1* | 5/2014 | Brooker | .................. | G06F 17/30 707/827 |
| 9,323,628 B2* | 4/2016 | Ngo | .................... | H04L 67/1008 |
| 2005/0278274 A1* | 12/2005 | Kovachka-Dimitrova | | ................. G06F 8/65 |
| 2007/0124374 A1* | 5/2007 | Arun | ...................... | G06Q 10/10 709/204 |
| 2013/0227568 A1* | 8/2013 | Anderson | .............. | G06F 9/455 718/1 |
| 2013/0239172 A1 | 9/2013 | Murakami et al. | | |
| 2013/0290543 A1* | 10/2013 | Lochhead | ........... | H04L 41/0806 709/226 |
| 2014/0325170 A1* | 10/2014 | Aswathanarayana | | ....................... G06F 9/45558 711/162 |
| 2015/0301824 A1 | 10/2015 | Patton et al. | | |

OTHER PUBLICATIONS

Final Office Action dated Aug. 18, 2016 corresponding to U.S. Appl. No. 14/319,054; 8 Pages.
Response to Office Action dated Feb. 3, 2016 corresponding to U.S. Appl. No. 14/319,054; Response filed on Apr. 26, 2016; 8 Pages.

(Continued)

*Primary Examiner* — Chris Parry
*Assistant Examiner* — Stephen J Houlihan
(74) *Attorney, Agent, or Firm* — Daly, Crowley, Mofford & Durkee, LLP (57) ABSTRACT

In one aspect, a method includes determining an allocation of nodes in a cluster to application containers using a node capacity and a policy, publishing the allocation to a coordinator, the coordinator configured to manage the nodes comprising a first node, reading the allocation from the coordinator and instructing a container manager in the first node to generate an application container in the first node conforming to the allocation.

20 Claims, 6 Drawing Sheets

(56) References Cited

OTHER PUBLICATIONS

Office Action dated Feb. 3, 2016 for U.S. Appl. No. 14/319,054; 8 Pages.
Eron D. Wright, et al.; "Allocating a Device to a Container," U.S. Appl. No. 14/319,054, filed Jun. 30, 2014 17 pages.
U.S. Appl. No. 14/319,054, filed Jun. 30, 2014 53 pages.
U.S. Non-Final Office Action dated Feb. 9, 2017 for U.S. Appl. No. 14/319,054; 11 Pages.
Response to U.S. Final Office Action dated Aug. 18, 2016 corresponding to U.S. Appl. No. 14/319,054; Response filed on Nov. 1, 2016; 7 Pages.
U.S. Advisory Action dated Nov. 30, 2016 corresponding to U.S. Appl. No. 14/319,054; 4 Pages.
Response to U.S. Office Action dated Feb. 9, 2017 corresponding to U.S. Appl. No. 14/319,054; Response filed on Apr. 10, 2017; 6 Pages.
U.S. Ex parte Quayle Office Action dated Jul. 5, 2017 for U.S. Appl. No. 14/319,054; 6 Pages.
Response to U.S. Ex parte Quayle Office Action dated Jul. 5, 2017 for U.S. Appl. No. 14/319,054; Response filed Jul. 24, 2017; 6 Pages.
Notice of Allowance dated Oct. 26, 2017 from U.S. Appl. No. 14/319,054; 8 Pages.

* cited by examiner

CLUSTER AWARE CONTAINER MANAGER

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In one aspect, a method includes determining an allocation of nodes in a cluster to application containers using a node capacity and a policy, publishing the allocation to a coordinator, the coordinator configured to manage the nodes comprising a first node, reading the allocation from the coordinator and instructing a container manager in the first node to generate an application container in the first node conforming to the allocation.

In another aspect, an apparatus includes electronic hardware circuitry configured to determine an allocation of nodes in a cluster to application containers using a node capacity and a policy, publish the allocation to a coordinator, the coordinator configured to manage the nodes comprising a first node, read the allocation from the coordinator; and instruct a container manager in the first node to generate an application container in the first node conforming to the allocation.

In a further aspect, an article includes a non-transitory computer-readable medium that stores computer-executable instruction. The instructions cause a machine to determine an allocation of nodes in a cluster to application containers using a node capacity and a policy, publish the allocation to a coordinator, the coordinator configured to manage the nodes comprising a first node, read the allocation from the coordinator; and instruct a container manager in the first node to generate an application container in the first node conforming to the allocation.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMWARE® and OPENSTACK®.

Generally, a data storage array or system may be one or more physical boxes or a cluster of physical boxes. In conventional systems, the data storage array or system may have one control path and one or more data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Figure 1:
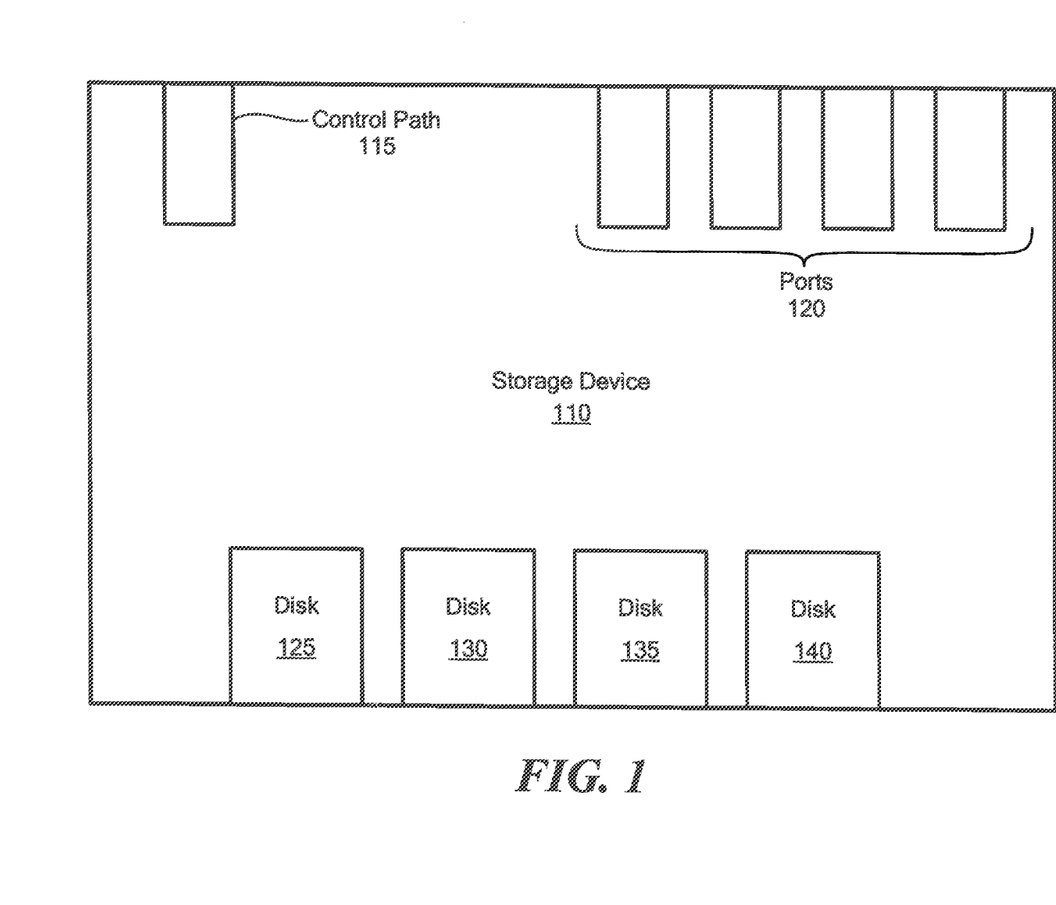
FIG. 1 is a simplified block diagram of an example of a data storage device.

Referring to FIG. 1, a storage device 110 includes a control path 115, ports 120, and disks 125, 130, 135 and 140. Control path 115 enables a user to interface with storage device 110. Control path 115 enables a user to access disks 125, 130, 135 and 140, via the services storage device 110 offers, through one or more of ports 120.

Figure 2:
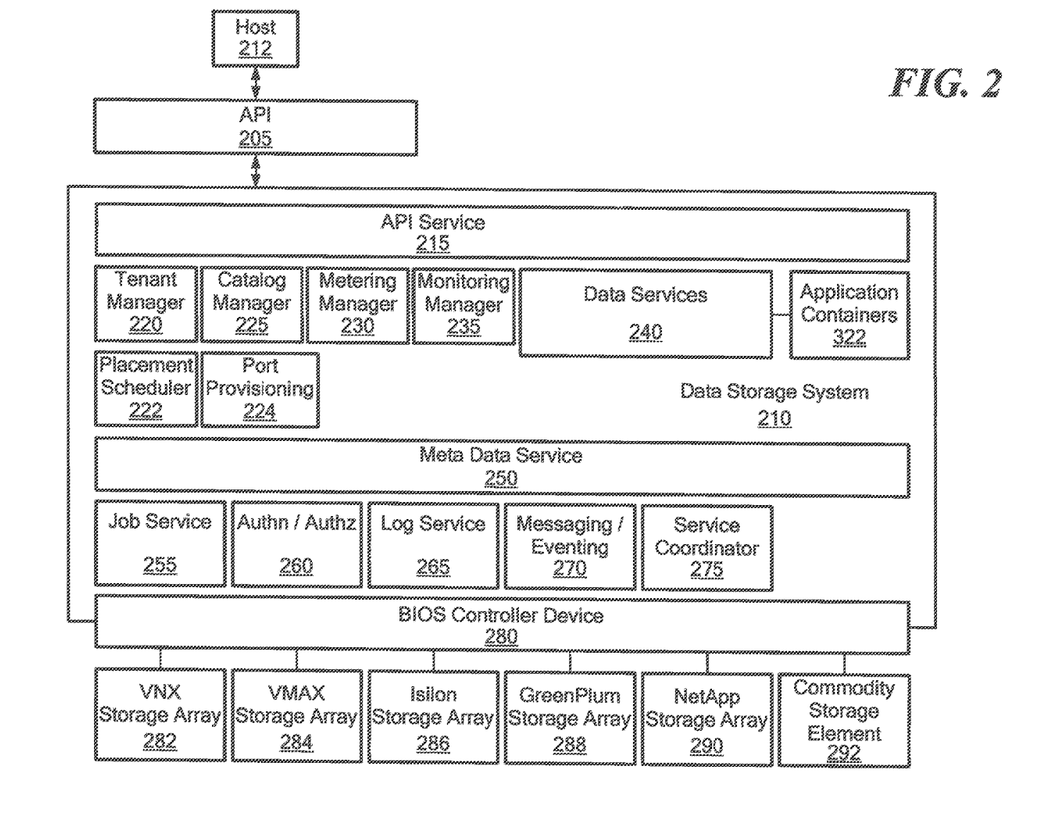
FIG. 2 is a simplified block diagram of an example of a data storage system.
Figure 3:
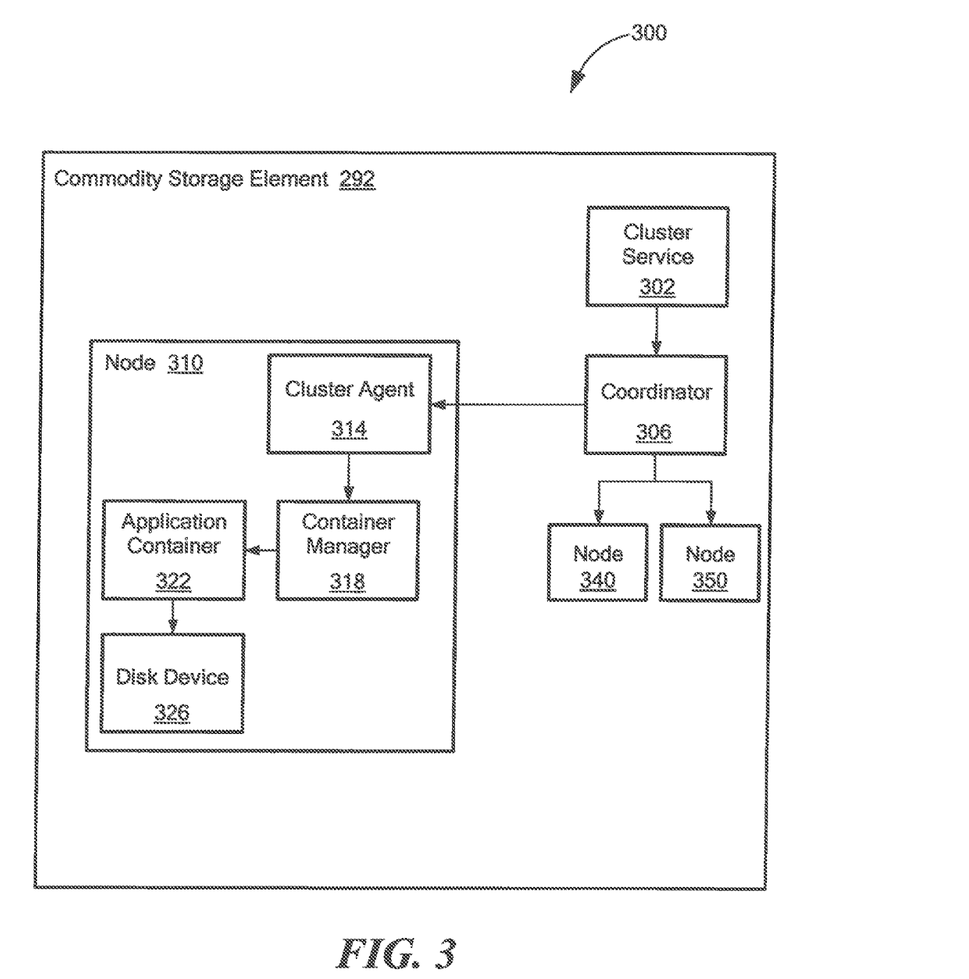
FIG. 3 is a simplified block diagram of components used to enable a container manager to be cluster aware.

Referring to FIG. 2, API Service 215 enables external access to Host 212 through API 205. API Service 215 communicates requests to one big array, data storage system 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, meta data service 250, job service 255, authn/authz 260, log service 265, messaging/eventing 270, port provisioning 224, placement scheduler 222, and BIOS Controller Device 280. As shown, port provisioning 224 allocates data storage ports from data storage volumes allocated from attached data storage. In this embodiment, attached data storage includes VNX storage array 282, VMAX storage array 284, Isilon storage array 286, GreenPlum storage array 288, and NetApp storage array 290, a commodity storage element 292. The commodity storage element 292 includes a cluster of nodes: node 310, node 340, node 350 (FIG. 3). In some examples, a node may be a host. The commodity storage element 292 provides basic storage atop ordinary disks by deploying a cluster agent 314 (FIG. 3). Basic storage is also provided by application containers 322 (FIG. 3). Commodity storage element 292 provides storage by deploying an application container that implements some storage semantic, such as "object" storage or "block" storage, writing data to disk devices on the local node in a manner appropriate to that form of storage. An agent 314 (FIG. 3) facilitates this by ensuring the correct application container(s) are deployed. A container describes the dependencies of an application in terms of program files, frameworks (e.g., Java or Python), software libraries on which the application is dependent, configuration files, and other application-specific resources. A container may also describe the dependencies of an application in terms of network ports on which the application is providing service, information about how to start/stop the application, environment variables to configure the application and so forth. A key attribute of a container is that each container is an isolated, independently serviceable unit within a host. A container typically contains a single application or service, typically playing some role within a larger distributed system. For example, a Web application can be described as a container that combines custom developed code with the applications' dependencies. Described herein is a container manager that is "cluster aware." That is, the container manager manages the coordinated execution of numerous containers across a cluster.

Referring to FIG. 3, a block diagram 300 that describes how to enable a container manager to be cluster aware includes a cluster service 302, a coordinator 306, a cluster agent 314, a container manager 318, an application container 322, a disk device 326 and the cluster of nodes 310, 340, 350. Each of the nodes includes a cluster agent, a container manager, at least one application container and at least one disk device. For example, the cluster agent 314, the container manager 318, the application container 322 and the disk device 326 are on the node 310.

The cluster service 302 is responsible for storing and manipulating capacity and policy data structures, typically based on user input via an API. The cluster service 302 implements a planning capability that translates capacity and policy into an allocation of containers to nodes.

The coordinator 306 facilitates coordination between the cluster agents 314 and the cluster service 302. In one example, the coordinator 306 is server software. In one particular example, the coordinator 306 is Apache Zoo-Keeper.

The cluster agent 314 is responsible for managing application containers on the node, based on allocation-level data structure as stored in the coordinator 306. The cluster agent 314 implements a 'control loop' that compares the allocation input with the current state of the application containers as provided by the container manager 318, and manipulates the container manager 318 to converge on the desired state. In some examples, the cluster agent 314 uses watches and polling loops as necessary. In some examples, the cluster agent 314 produces health-level data structure based on a convergence state. For example, the cluster agent 314 continuously writes health information about allocated containers to a shared state. The cluster service 302 occasionally re-evaluates the allocation based on the observed health of the application containers. For example, if a certain node's application containers are unhealthy, and a minimum threshold of healthy application containers is crossed for a given aspect of the system, a new allocation is generated.

The application container 322 is a container placed onto a node (e.g., node 310), for the purpose of providing some form of storage, which is aggregated to the cluster. The application container 322 itself contains no stored data. Rather, it contains application code that is specific to the type of storage desired. Disk devices (e.g., disk device 326) are used for actual storage by the application container 322.

The container manager 318 manages the application containers (e.g., application container 322). In one example, the container manager 314 is a container manager by Docker, Inc.

Figure 4:
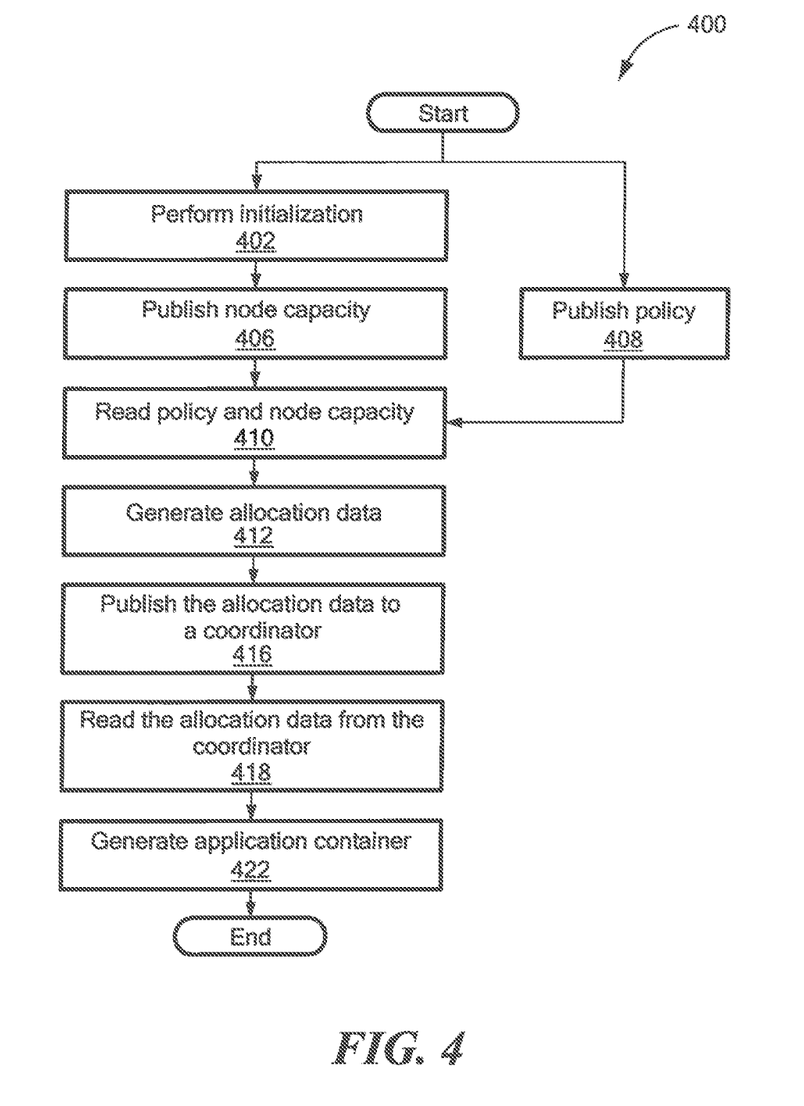
FIG. 4 is a simplified flow diagram of an example of a process to enable a container manager to be cluster aware.

Referring to FIGS. 3 and 4, an example of a process to enable a container manager to be cluster aware is process 400. Process 400 performs an initialization (402). The cluster service 302 generates an initial allocation of application containers to nodes. The cluster agent 314 reads the allocation data (allocation of container to nodes) and starts the application containers in the container manager 318 as necessary.

Process 400 publishes a node capacity (406). For example, the cluster agent 314 publishes the node capacity to the coordinator 306.

Process publishes a policy (408). For example, a user using a user interface (e.g., user interface 508 (FIG. 5)) publishes the policy to the coordinator 306.

Process 400 reads the policy and the node capacity (410). For example, the cluster service 302 reads the policy and the node capacity.

Process 400 generates (412) and publishes (416) the allocation data (allocation of containers to nodes). For example, the cluster service 302 uses the published information (e.g., node capacity and policy) to update the allocation data, which the cluster service 302 publishes to the coordinator 306.

Process 400 reads the allocation data (418) and generates the application container (422). For example, the cluster agent 314 reads the allocation data from the coordinator 306, and instructs the container manager 318 to generate the application container 322.

Figure 5:
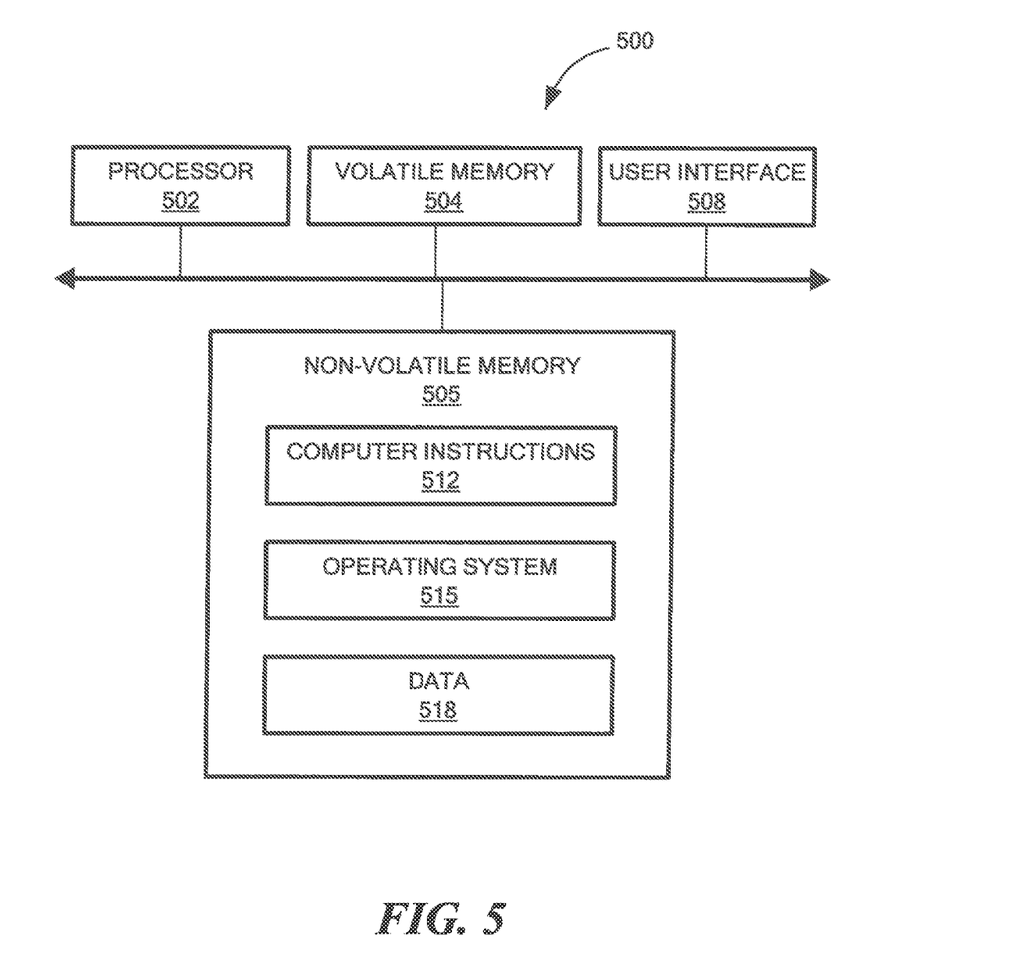
FIG. 5 is a simplified block diagram of an example of a computer on which any of the process of FIG. 4 may be implemented.

Referring to FIG. 5, a computer includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 400).

The processes described herein (e.g., process 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Figure 6:
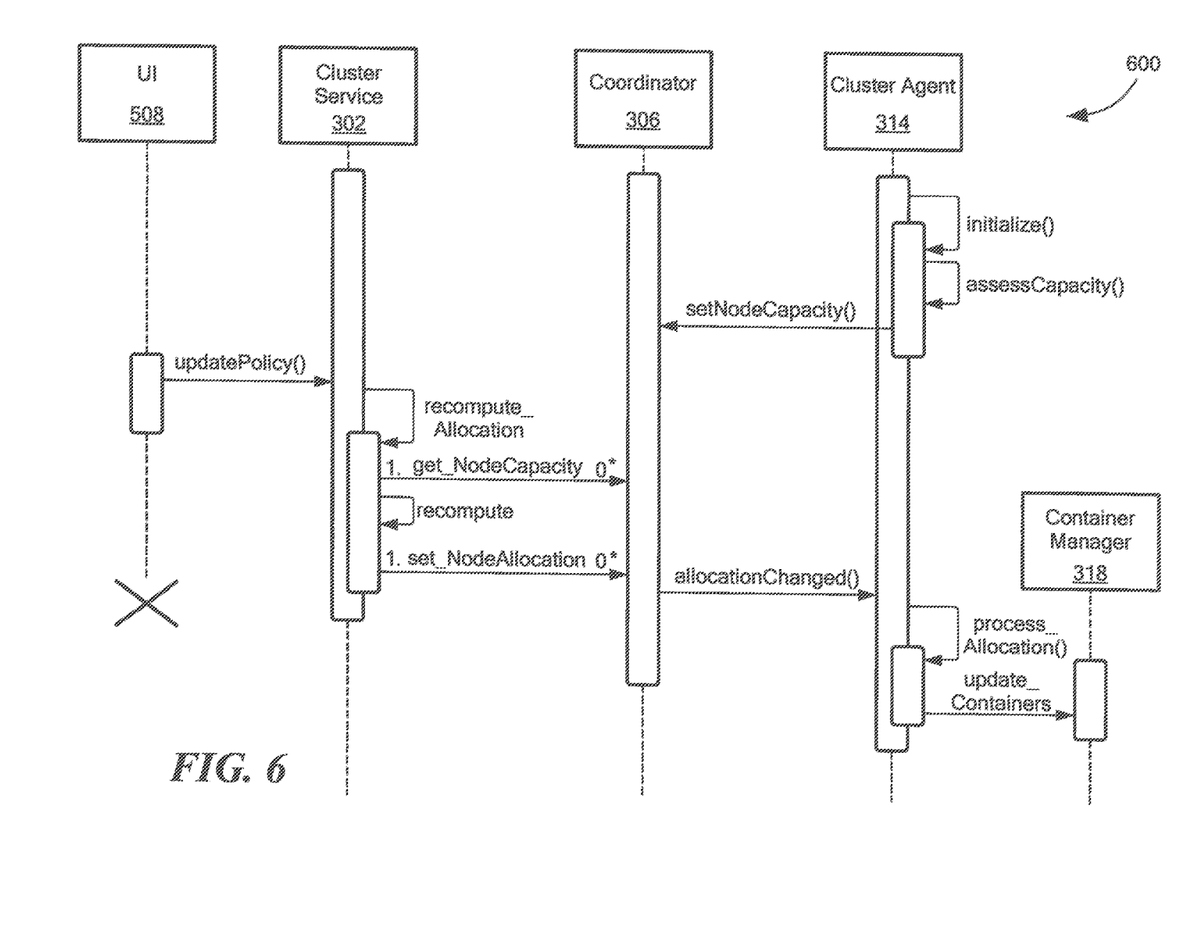
FIG. 6 is a simplified sequence diagram of an example of a process to enable a container manager to be cluster aware.

The processes described herein are not limited to the specific examples described. For example, the process 400 in FIG. 4 may be realized as a sequence diagram 600 (FIG. 6). In another example, the process 400 is not limited to the specific processing order of FIG. 4. Rather, any of the processing blocks of FIG. 4 may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:

determining an allocation of nodes in a cluster to application containers using a node capacity and a policy, wherein at least one of the application containers comprises information relating to application-specific resources and dependencies used to run at least one of an application and a service that is associated with the at least one application container, wherein the application-specific resources and dependencies comprise information describing the dependencies of the at least one application or service in terms of network ports on which the at least one application or service is providing service, information about how to start/stop the at least one application or service, and environment variables to configure the at least one application or service;

configuring at least one of the application containers to implement a storage application having object or block storage semantics, wherein the at least one of the application containers further comprises information describing-dependencies of the storage application in terms of program files, libraries on which the storage application is dependent, and configuration of the storage application;

publishing the allocation to a coordinator, the coordinator configured to manage the nodes comprising a first node;

reading the allocation from the coordinator;

instructing a container manager in the first node to generate at least one application container in the first node conforming to the allocation;

observing, at least periodically, information about a current state of the application container in the first node, the current state comprising information relating to health information about the one or more application containers allocated in the first node, wherein the health information comprises information relating to health of the respective at least one application or service associated with the one or more application containers, including health of the application-specific resources and dependencies, wherein the health information is written to a shared state by a cluster agent running on the first node;

dynamically reevaluating the allocation based on the observed health information; and dynamically generating one or more new allocations of containers if, based on the reevaluation of the allocation, a minimum threshold of healthy containers is crossed for a given aspect of a computer system containing the cluster.

2. The method of claim 1, wherein instructing a container manager in the first node to generate an application container in the first node conforming to the allocation comprises instructing a container manager in the first node to generate an application container in the first node conforming to the allocation using a cluster agent at the first node.

3. The method of claim 2, wherein reading the allocation from the coordinator comprises reading the allocation from the coordinator using the cluster agent.

4. The method of claim 1, further comprising generating an initial allocation of containers to nodes;
wherein determining an allocation of nodes in a cluster to application containers using a node capacity and a policy comprises updating the initial allocation.

5. The method of claim 4, wherein generating the initial allocation comprises generating the initial allocation using a cluster service.

6. The method of claim 1, further comprising:
publishing the node capacity to the coordinator; and
publishing the policy to the coordinator.

7. The method of claim 1, further comprising:
comparing the allocation of nodes to a current state of the application containers; and
configuring the container manager to converge on a desired state for the application containers.

8. An apparatus, comprising electronic hardware circuitry configured to:
determine an allocation of nodes in a cluster to application containers using a node capacity and a policy, wherein at least one of the application containers comprises information relating to application-specific resources and dependencies used to run at least one of an application and a service that is associated with at least one application container, wherein the application-specific resources and dependencies comprise information describing the dependencies of the at least one application or service in terms of network ports on which the at least one application or service is providing service, information about how to start/stop the at least one application or service, and environment variables to configure the at least one application or service;
configure at least one of the application containers to implement a storage application having object or block storage semantics, wherein the at least of the application containers further comprises information describing dependencies of the storage application in terms of program files, libraries on which the storage application is dependent, and configuration of the storage application;
publish the allocation to a coordinator, the coordinator configured to manage the nodes comprising a first node;
read the allocation from the coordinator;
instruct a container manager in the first node to generate at least one application container in the first node conforming to the allocation;
observe, at least periodically, information about a current state of the application container in the first node, the current state comprising information relating to health information about the one or more application containers allocated in the first node, wherein the health information comprises information relating to health of the respective at least one application or service associated with the one or more application containers, including health of the application-specific resources and dependencies, wherein the health information is written to a shared state by a cluster agent running on the first node;
dynamically reevaluate the allocation based on the observed health information; and
dynamically generate one or more new allocations of containers if, based on the reevaluation of the allocation, a minimum threshold of healthy containers is crossed for a given aspect of a computer system containing the cluster.

9. The apparatus of claim 8, wherein the circuitry comprises at least one of a processor, a memory, a programmable logic device or a logic gate.

10. The apparatus of claim 8, wherein the circuitry configured to instruct a container manager in the first node to generate an application container in the first node conforming to the allocation comprises circuitry configured to instruct a container manager in the first node to generate an application container in the first node conforming to the allocation using a cluster agent at the first node.

11. The apparatus of claim 10, wherein the circuitry configured to read the allocation from the coordinator comprises reading the allocation from the coordinator using the cluster agent.

12. The apparatus of claim 8, further comprising circuitry configured to generate an initial allocation of containers to nodes;
wherein the circuitry configured to determine an allocation of nodes in a cluster to application containers using a node capacity and a policy comprises circuitry configured to update the initial allocation.

13. The apparatus of claim 12, wherein the circuitry configured to generate the initial allocation comprises circuitry configured to generate the initial allocation using a cluster service.

14. The apparatus of claim 8, further comprising circuitry configured to:
publish the node capacity to the coordinator; and
publish the policy to the coordinator.

15. An article comprising non-transitory computer-readable medium that stores computer-executable instructions, the instructions causing a machine to:
determine an allocation of nodes in a cluster to application containers using a node capacity and a policy, wherein at least one of the application containers comprises information relating to application-specific resources and dependencies used to run at least one of an application and a service that is associated with the at least one application container, wherein the application-specific resources and dependencies comprise information describing the dependencies of the at least one application or service in terms of network ports on which the at least one application or service is providing service, information about how to start/stop the at least one application or service, and environment variables to configure the at least one application or service;
configure at least one of the application containers to implement a storage application having object or block storage semantics, wherein the at least of the application containers further comprises information describing dependencies of the storage application in terms of program files, libraries on which the storage application is dependent, and configuration of the storage application;

publish the allocation to a coordinator, the coordinator configured to manage the nodes comprising a first node;

read the allocation from the coordinator;

instruct a container manager in the first node to generate at least one application container in the first node conforming to the allocation;

observe, at least periodically, information about a current state of the application container in the first node, the current state comprising information relating to health information about the one or more application containers allocated in the first node, wherein the health information comprises information relating to health of the respective at least one application or service associated with the one or more application containers, including health of the application-specific resources and dependencies, wherein the health information is written to a shared state by a cluster agent running on the first node;

dynamically reevaluate the allocation based on the observed health information; and dynamically generate one or more new allocations of containers if, based on the reevaluation of the allocation, a minimum threshold of healthy containers is crossed for a given aspect of a computer system containing the cluster.

16. The article of claim 15, wherein the instructions causing the machine to instruct a container manager in the first node to generate an application container in the first node conforming to the allocation comprises instructions causing the machine to instruct a container manager in the first node to generate an application container in the first node conforming to the allocation using a cluster agent at the first node.

17. The article of claim 16, wherein the instructions causing the machine to read the allocation from the coordinator comprises reading the allocation from the coordinator using the cluster agent.

18. The article of claim 15, further comprising instructions causing the machine to generate an initial allocation of containers to nodes;

wherein the instructions causing the machine to determine an allocation of nodes in a cluster to application containers using a node capacity and a policy comprises instructions causing the machine to update the initial allocation.

19. The article of claim 18, wherein the instructions causing the machine to generate the initial allocation comprises instructions causing the machine to generate the initial allocation using a cluster service.

20. The article of claim 15, further comprising instructions causing the machine to:

publish the node capacity to the coordinator; and publish the policy to the coordinator.

* * * * *